United States Patent [19]
Le Pesant et al.

[11] Patent Number: 4,701,021
[45] Date of Patent: Oct. 20, 1987

[54] OPTICAL MODULATOR

[75] Inventors: Jean-Pierre Le Pesant, Gif sur Yvette; Michel Hareng, La Norville; Bruno Mourey, Boulogne Billancourt; Jean-Noël Perbet, Gif sur Yvette, all of France

[73] Assignee: Thomson-CSF, Paris, France

[21] Appl. No.: 662,156

[22] Filed: Oct. 18, 1984

[30] Foreign Application Priority Data

Oct. 21, 1983 [FR] France ................ 83 16794

[51] Int. Cl.[4] ............................ G02B 26/02
[52] U.S. Cl. .................... 350/267; 350/269
[58] Field of Search ............ 350/267, 269, 355–357

[56] References Cited
U.S. PATENT DOCUMENTS 3,904,868 9/1975 McEwan .............. 250/201

FOREIGN PATENT DOCUMENTS 1494150 12/1977 United Kingdom .

OTHER PUBLICATIONS

Applied Physics Letters, vol. 40, No. 1, Jan. 1982, pp. 4–6, New York, J. L. Jackel et al, "Electrowetting Optical Switch".
Patents Abstracts of Japan, vol. 5, No. 52 (P-56)(724), Apr. 11, 1981, and JP-A-56 6203 (Nippon Denshin Denwa Kosha), Jan. 22, 1981.

*Primary Examiner*—Bruce Y. Arnold
*Attorney, Agent, or Firm*—Oblon, Fisher, Spivak, McClelland, & Maier

[57] ABSTRACT

Optical modulator of a light beam comprising cells employing the displacement of an absorbent liquid and arranged in series on the path of the beam with a liquid displacement cell permitting a reflection of the beam.

13 Claims, 9 Drawing Figures

OPTICAL MODULATOR

BACKGROUND OF THE INVENTION

The invention relates to an optical modulator and more particularly to an achromatic attenuator, particularly for guidance and camera lenses.

Numerous different devices exist for attenuating the intensity of light. Thus, there are attenuators with mechanical displacement of optical devices, attenuators by the electrochemical deposition of a metal on the transparent conductive walls of an electrolytic tank, attenuators by reduction or oxidation of thin metal films and attenuators utilizing the effect of an electrical field in a mixture of a liquid crystal and a dichroic dye.

The object of the invention is to propose a modulator using a different process and which can be more particularly be used in tracking sights. This type of application requires high transmission dynamics exceeding 20 dB for compensating surrounding illumination variations, which can be sudden, as well as a high transmission in the open state in order to permit the detection of the light reflected by the target. Moreover, the specific technical characteristics of the detection device require a spectral pass band between 0.4 and 1.1 microns and a minimum image distortion.

Within the scope of the invention, it is proposed that use be made of the movements of electrically controlled thin liquid layers without any intervention of movable mechanical means, in order to modify the refraction and absorption conditions encountered by a light beam traversing the attenuation device.

French Patent Application 83.04745, filed by the Applicant Company on Mar. 23, 1983 describes a device making it possible to displace a liquid layer. Such a device comprises a capillary space defined by two confinement plates, whose inner faces are provided with electrodes and make it possible to apply an electrical field to the capillary space. The latter contains two immiscible fluids having different dielectric permittivities. The application of a voltage between the electrodes gives rise to an electrical field attracting the higher permittivity fluid. The physical phenomenon is the well known phenomenon of filling a capacitor with a dielectric liquid, whilst establishing electrical field gradients and an electrostatic energy variation.

The position control of the fluids in the capillary space is obtained on the one hand by the choice of the electrical fields applied and on the other by specific surface treatments making the surfaces of the electrodes more wetting than the surrounding surfaces. For example, in the case of transparent metallic oxide electrodes, such as the indium - tin oxide, etched on glass, there is a deposit of a polymerized monomolecular organosilane coating.

Thus, the invention supplies a system realising the thus described liquid displacement phenomenon.

BRIEF SUMMARY OF THE INVENTION

The invention relates to an optical modulator for a light beam using the electrically controlled fluid displacement cells constituted by two parallel transparent plates, defining a capillary space connected to a reservoir containing at least one fluid, as well as to devices for applying electrical fields making it possible to control the displacement of the liquid between the reservoir and the capillary space, comprising at least one cell of a first type, whose transparent plates are positioned perpendicular to the direction of the beam, the capillary space being in the section of the beam and the fluid of the cell being absorbent, means for measuring the intensity of the light beam supplying at each instant a measuring signal proportional to the intensity of the light beam, as well as means for controlling the devices for applying electrical fields connected to the measuring means, receiving the measuring signal and, in response, supplying a signal making it possible to control the devices for applying electrical fields.

BRIEF DESCRIPTION OF THE DRAWINGS

The invention is described in greater detail hereinafter relative to non-limitative embodiments and the attached drawings, wherein.

DETAILED DESCRIPTION OF THE PREFERRED EMBODIMENTS

Figure 1:
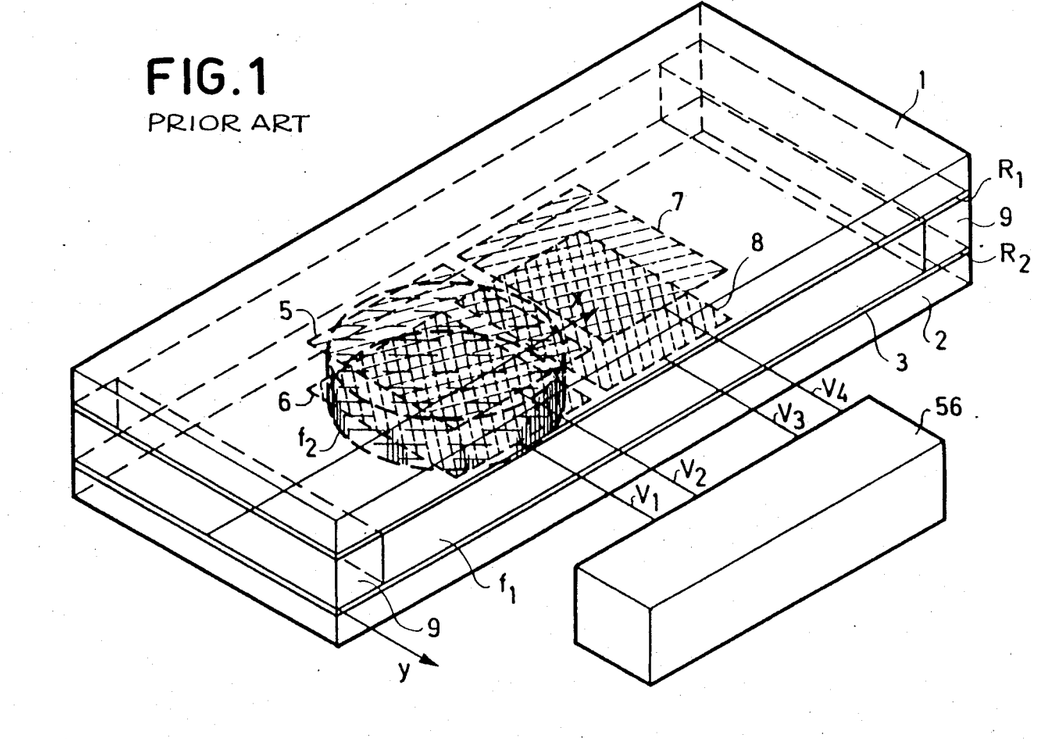
FIG. 1 is an explanatory isometric view of a known liquid displacement device.

An electrical device for the displacement of globules, as represented by the isometric view of FIG. 1, comprises two transparent plates 1, 2 separated by spacers 9. Thus, they define a capillary space 3, filled with two fluids $f_1$ and $f_2$. Two groups of electrodes 5, 6 and 7, 8 are deposited in facing manner on the surfaces of plates 1 and 2, defining the capillary space 3. An electric generator 56, on request, supplies potential differences on wires $V_1$ and $V_2$, on the one hand towards electrodes 5, 6, and $V_3$ and $V_4$, on the other hand, towards electrodes 7, 8. These potential differences can be of the order of 100 to 300 V for producing electrical displacement fields of approximately $5.10^6$–$6.10^7$ V/m.

For example, fluid $f_1$ is air. Fluid $f_2$ can be chosen from among the hydrocarbons, such as alkanes, containing 5 to 25 carbon atoms, ketones (acetone, cyclohexanone, methyl ethyl ketone) or nitro derivatives (nitrobenzene, nitrotoluene).

The use of liquid mixtures for forming fluid $f_2$ makes it possible to check the surface tension, prevent the dislocation of the globules during their displacement and optimize the response time of the device to the electrical controls.

Fluid $f_2$ is shaped like a globule and is gripped between plates 1 and 2. Its volume is such that, when placed between electrodes 5 and 6 as shown in FIG. 1, it projects slightly beyond the contour of the electrodes. It could also be more voluminous and could encroach on the pair of electrodes 7 and 8.

To move globule $f_2$ from the interelectrode space 5, 6 to the interelectrode space 7, 8, to electrode 7, 8 is applied a potential difference $V_3-V_4$ exceeding the potential difference $V_1-V_2$. To return the globule to its initial position, the reverse operation is performed. If equal potential differences are applied at the same time, or if no potential difference is applied, there is no displacement of globule $f_2$.

A description will now be given of the optical modulator according to the invention utilizing the previously described liquid displacement process.

Figure 2:
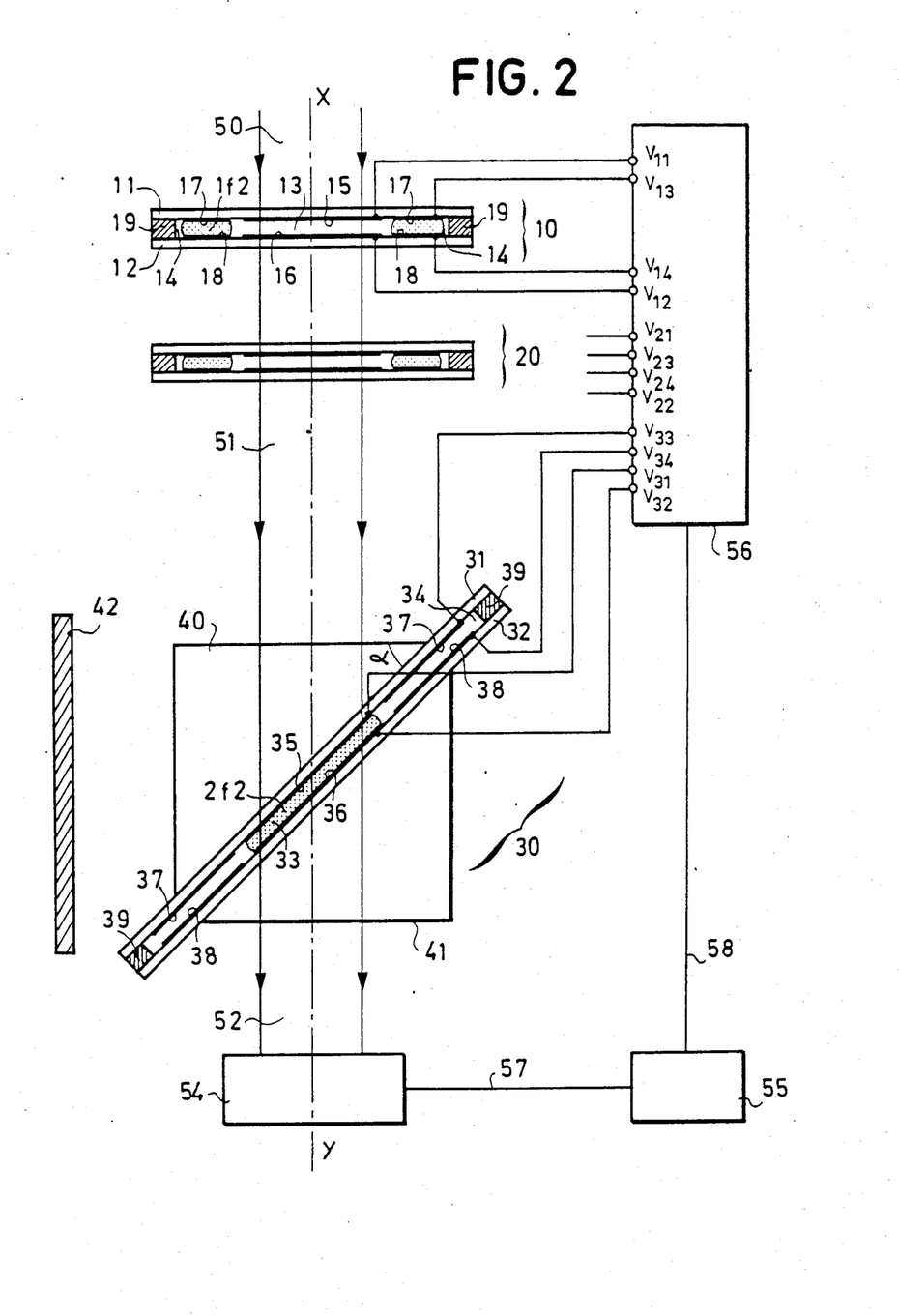
FIGS. 2, 3 and 4 are explanatory views of an optical attentuator according to the invention.

The modulator of FIG. 2 comprises a first type of cell, such as 10 and 20, a second type of cell, such as 30, a device for measuring the light intensity 54, a control circuit 55 and a voltage generator 56.

Cell 10 comprises two transparent plates 11, 12, which are kept spaced parallel to one another by spacers 19. Onto the inner faces of plates 11, 12 are deposited central electrodes 15, 16, which define a volume 13 called the capillary space. On either side of electrodes 15, 16 are deposited electrodes 17, 18. The electrode pairs 17, 18 also define volumes 14 called reservoirs.

A fluid 1f2 is placed between plates 11 and 12 and has a composition such that it has a given light absorption level. In FIG. 2 this fluid is distributed in reservoirs 14. The capillary space contains another fluid, such as air.

Electrodes 15, 16 are respectively connected to outputs V1 and V2 of a voltage generator 56. The electrodes 17, located on either side of electrode 15, are interconnected by not shown connections and are connected to an output V13 of generator 56. The same applies with regards to electrodes 18, which are connected to the output V14 of generator 56.

Cell 20 has the same construction as cell 10, so that it will not be described again. Its electrodes are connected in the same way by not shown connections to outputs V21 to V24 of generator 56.

Cell 30 comprises two transparent plates 31, 32, which are kept parallel to one another by spacers 39 and which carry central electrodes 35, 36, together with peripheral electrodes 37, 38. Electrodes 35, 36 define a capillary space 33. The electrodes 37, 38 define reservoirs 34. A fluid 2f2, which is transparent and has a refractive index similar to that of plates 31, 32 is placed between the latter. In FIG. 2, fluid 2f2 is placed in capillary space 33.

Plates 31 and 32 slope by an angle $\alpha$ of e.g. $\pi/4$ radians, with respect to the plates of cells 10. They are located between two prisms 40, 41 having an isosceles rectangular section and are arranged in head to tail manner. The refractive index of prisms 40 and 41 is equal to that of plates 31 and 32 and of fluid 2f2.

The electrical connections of the electrodes of cell 30 are identical to those of cell 10, with electrodes 35, 36, 37, 38 respectively connected to outputs V31, V32, V33 and V34.

An absorbent screen 42 is positioned in front of plate 31 and forms therewith a dihedral angle of value $\pi/2 - \alpha$, i.e. an angle of $\pi/4$ radians in the present example. Cells 10, 20 and 30 are aligned along an axis XY passing through the centre of the capillary spaces 13, 33 of the cells. A device 54 for measuring the light intensity is positioned along this axis XY and is connected by a connection 57 to a control circuit 55, which is itself connected to generator 56 by a connection 58.

As the fluids of cells 10, 20, 30 occupy the positions indicated in FIG. 2, if a beam 50 is transmitted along axis XY to cell 10, it is transmitted by cells 10 and 20 without deflection and substantially without attenuation. The beam 51 transmitted by cell 20 is also transmitted by the cell acting as a parallel plate, due to the presence of fluid 2f2 in the capillary space and the equal values (or sufficiently close to ensure that there is no total reflection) of the refractive indices of plates 31, 32 of prisms 40, 41 and of fluid 2f2. Beam 52 emerging from prism 41 is received by a device 54 for measuring the light intensity and which supplies on the connection, a measuring signal proportional to the light intensity of beam 52. As a function of the value of this signal, control circuit 55 supplies a control signal on connection 58. The generator 56 then applies to its output V11 to V32 control voltages which are suitable for controlling cells 10, 20 and 30.

Thus, the application of a potential difference between outputs V11 and V12, to electrodes 15, 16, greater than that applied between outputs V13 and V14, gives rise to an electrical field higher than that prevailing in reservoirs 14 in the capillary space 13 of cell 10. Fluid 1f2 of reservoirs 14 moves towards capillary space 13 and assumes the position shown in FIG. 3. No voltage is applied to outputs V21 to V32, so that there is no displacement of the fluids of cells 20 and 30.

Figure 3:
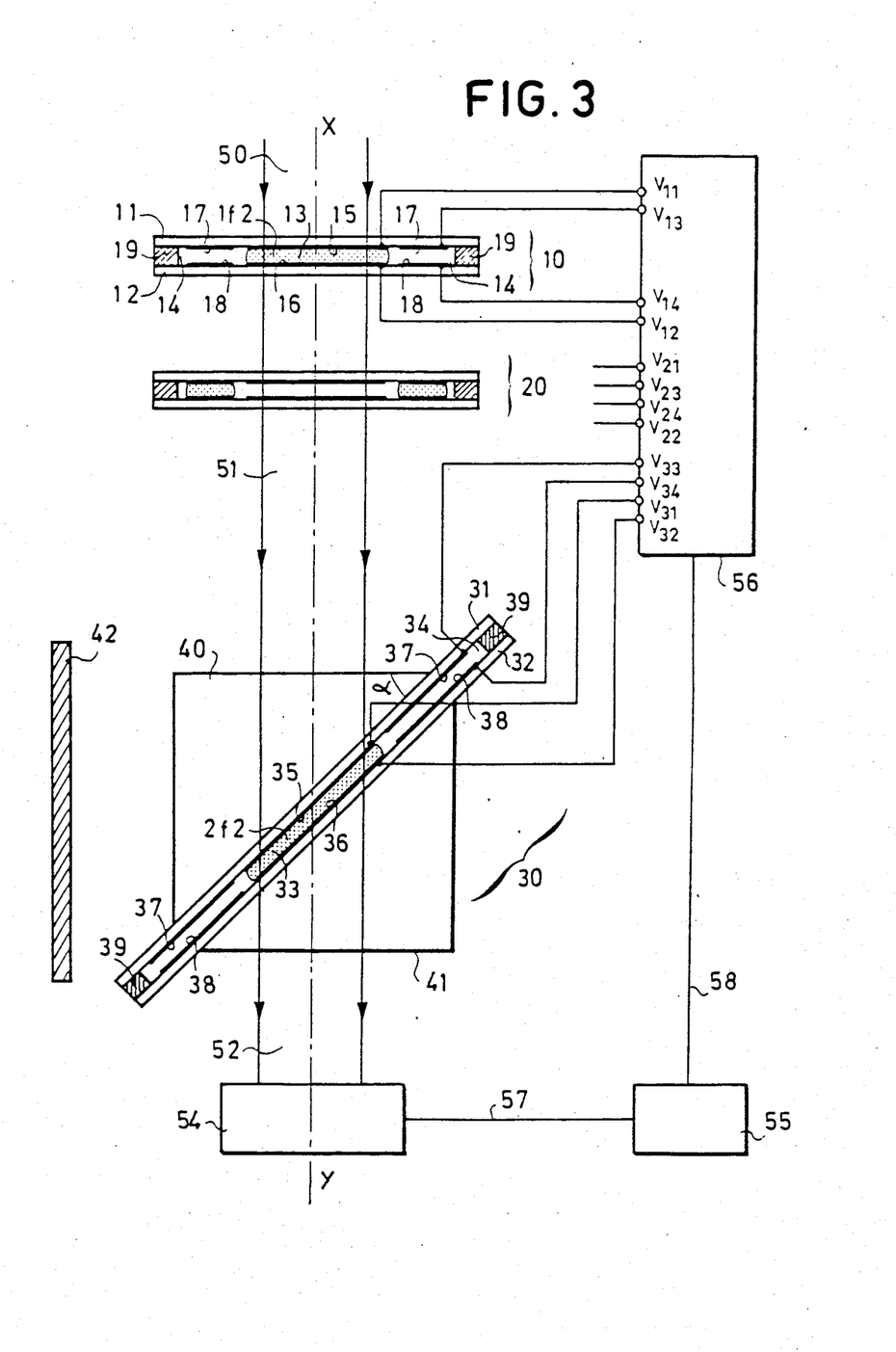

Thus, the modulator according to the invention becomes such as is shown in FIG. 3. A light beam 50 received by cell 10 along axis XY is partly absorbed by the fluid 1f2 due to its light absorption level. Thus, cell 10 transmits an attenuated light beam. Cell 20 transmits an unattenuated beam 51. The same applies with regards to cell 30, as has been stated hereinbefore. Thus, the beam 52 emerging from the optical modulator is attenuated.

If the light intensity of this beam is too high, as a function of the value of the signal measured by the measuring device, control circuit 55 can control generator 56, in such a way that it applies a control voltage on outputs V21 and V22 towards the central electrodes of the cell 20. The fluid of said cell moves and assumes the same position as the fluid of cell 10. After attenuation by cell 10, light beam 50 is again attenuated by cell 20 and is transmitted by cell 30. Thus, an attenuation greater than the preceding attenuation is obtained.

If the attenuation of the light beam has to be very high, the control circuit supplies a signal on connection 58, so that generator 56 applies a voltage between outputs V33 and V34 which is higher than the voltage between outputs V31 and V32. The electrical field between electrodes 37 and 38 of cell 30 attracts fluid 2f2 into reservoirs 34 located on either side of the capillary space. Cell 30 passes into the state shown in FIG. 4.

Figure 4:
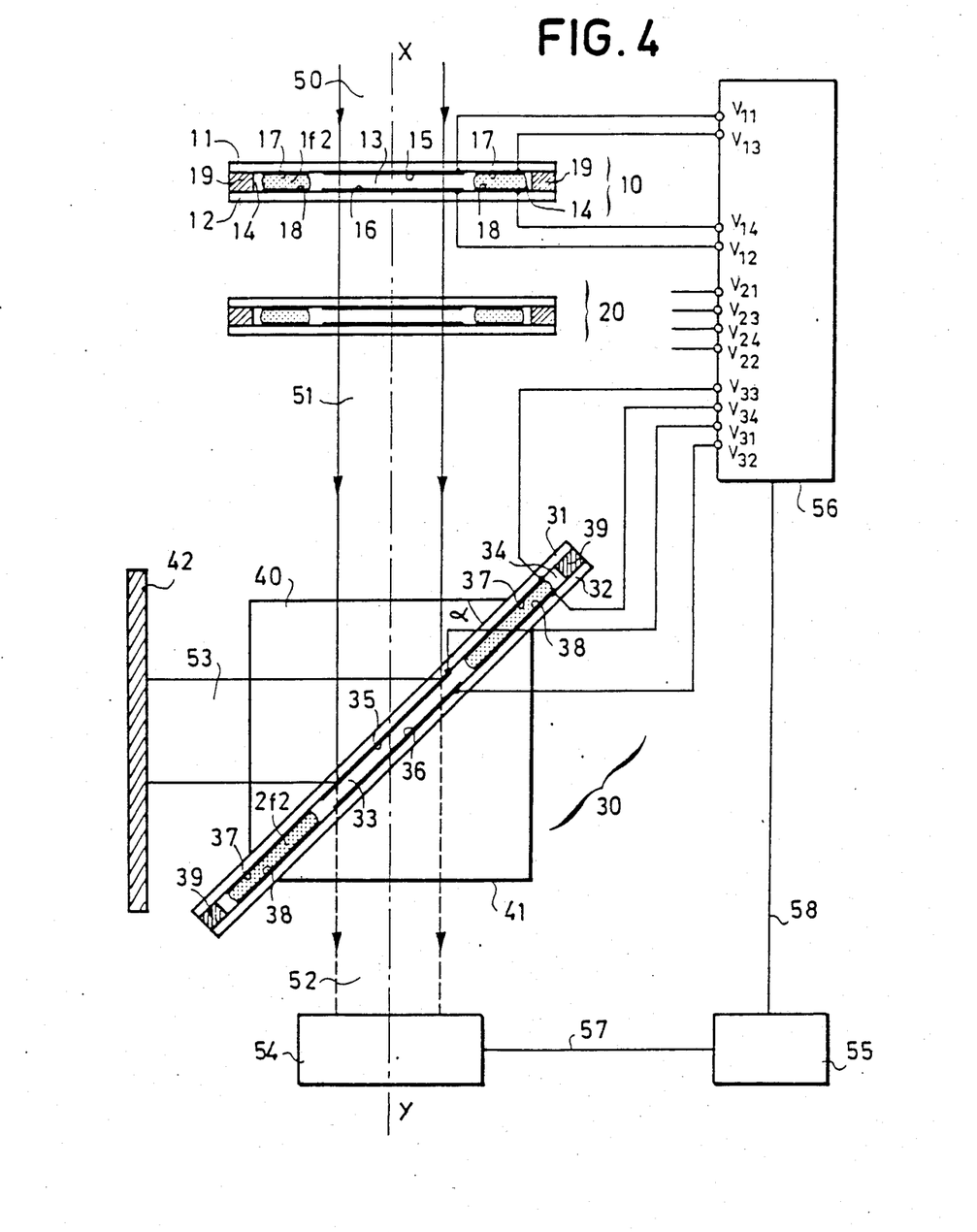

A beam 51 then reaches plate 31 of cell 30 and in the absence of fluid 2f2 is almost completely reflected by the inner face of the plate, in the form of a beam 53, towards the absorbent panel 42. Nevertheless, a small part of the incident beam 51 is transmitted and a low intensity beam 52 emerges from the modulator.

It is pointed out that in FIG. 4, cells 10 and 20 are shown with their fluid placed in the reservoirs, so that they have no absorption function. It serves no useful purpose here, due to the high attenuation provided by cell 30. In order to bring the optical modulator into this state, the control circuit 55, by controlling generator 56, in such a way that it applies a voltage to electrodes 37, 38, must also order generator 56 to apply a voltage to outputs V13, V14, V23, V24 connected to electrodes, such as 17 and 18 of cell 10. If the fluid is located in the capillary space of cells 10 and 20, it is attracted into the reservoirs.

FIGS. 2 to 4 only show two cells 10 and 20 of the type containing an absorbent fluid. In order to increase the number of degrees of attenuation and improve the flexibility of the modulator, it is advantageous to provide, in series in light beam direction XY, a larger number of cells, which can be wholly or partly controlled.

The useful space for the modulation of the light beam is the capillary space in each of these cells. In certain applications, the overall dimensions of the reservoirs on either side of the cells can be a disadvantage and it is advantageous to reduce these dimensions. The thickness of the reservoirs is then made to exceed that of the capillary spaces.

Figure 5:
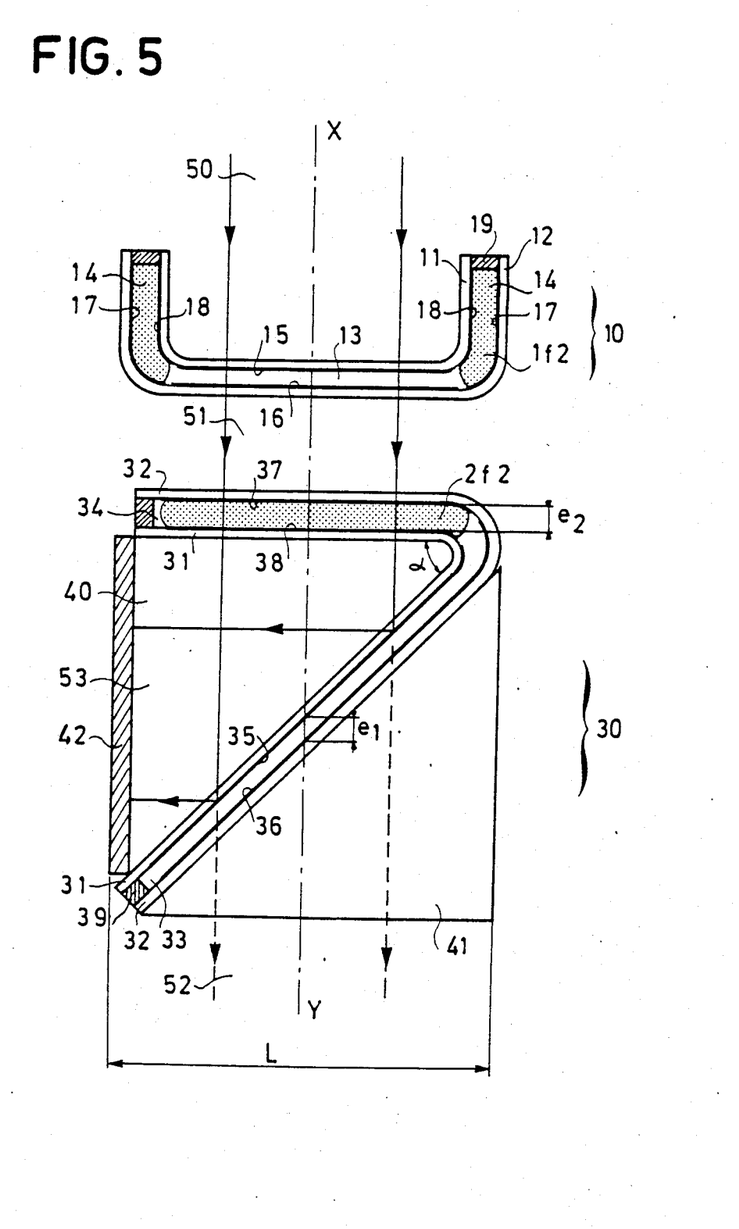
FIG. 5 is an embodiment according to the invention.

As is the case in FIG. 5, the reservoirs of a cell of the type containing an absorbent liquid, like those of cell 10, are arranged parallel to the direction XY of light beam 50. Plates 11 and 12 are curved perpendicular to the plane of the cell. The thickness of the reservoirs exceeds the thickness of the capillary space, so as to make them more compact.

Electrodes 17 and 18 surround the reservoir adopting the curvature of plates 11 and 12, in order to facilitate the start of the displacement of fluid 1f2. As in the description of FIGS. 2 to 4, when the fluid 1f2 is in the reservoirs, the cell transmits a beam without absorption, whilst when the fluid is in capillary space 13 the cell is absorbent.

With regards to cell 30, plates 31 and 32 are bent by an angle $\alpha$ of e.g. $\pi/4$ radians. They define a capillary space 33, which is inclined relative to the axis XY and a reservoir 34 perpendicular to axis XY.

When the fluid 2f2 is attracted by electrodes 35, 36 into the capillary space 33, the light beam 51 is still not deflected by the reservoir 34, which then contains air. This light beam reaches capillary space 33 which, through containing fluid 2f2, transmits the light beam in the manner described relative to FIG. 2.

The thicknesses of capillary space 33 and of reservoir 34 have been chosen in such a way that in direction XY, the distance el between the two plates 31, 32 is equal to the thickness e2. No matter whether the fluid is in capillary space 33 or in reservoir 34 during its transmission by cell 30, a light beam will traverse the same thickness of fluid 2f2 and of air. Thus, the optical paths will not be modified in transmission. Bearing in mind the thickness e2, the dimensions of reservoir 33 are calculated so as to contain all the fluid 2f2.

Figure 6:
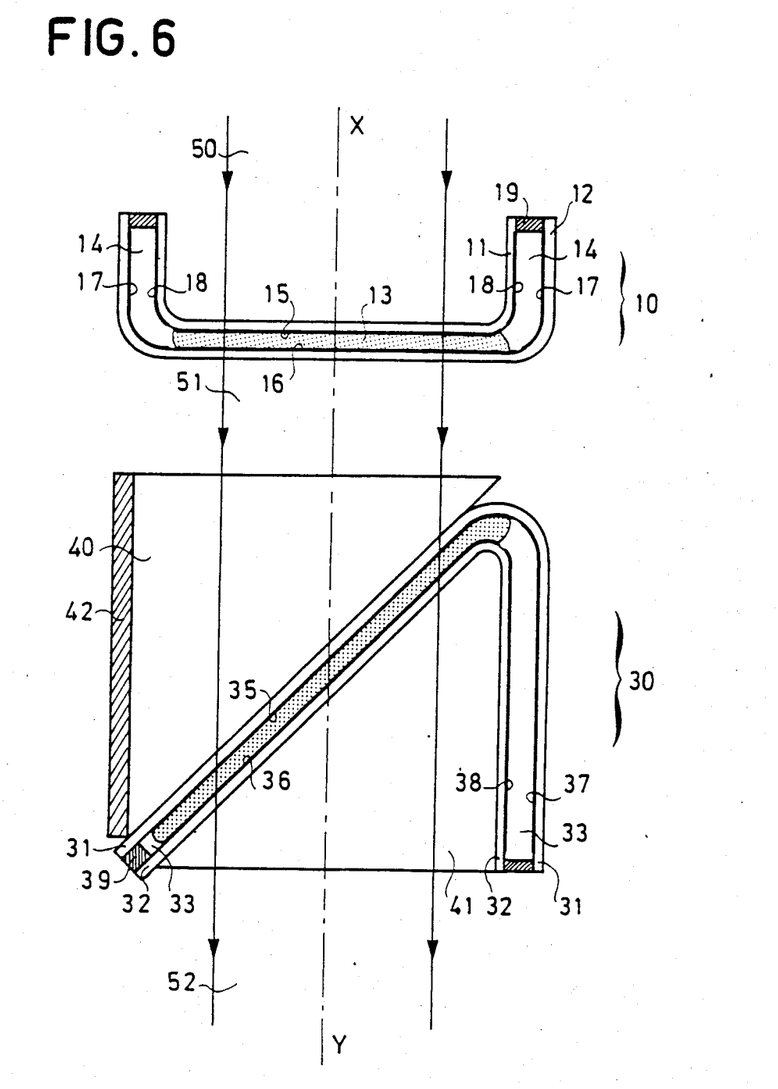
FIG. 6 is a variant of an embodiment according to the invention.

With reference to FIG. 6, a description will now be given of a variant of modulator of FIG. 5. According to this variant, cell 10 is unchanged. However, cell 30, constructed in the same way as the cell of FIG. 5, has its reservoir 33 parallel to axis XY. Thus, a light beam traversing the cell will not traverse reservoir 33.

According to a preferred and non-limitative embodiment, the glass plates of the cells are made from glass having a refractive index 1.5 and a thickness of 1.5 mm. The spacers 19-39 are cut from a polymer film, e.g. a film of "MYLAR" or "KAPTON", registered trade marks of the firm DU PONT DE NEMOURS. The thickness of the spacers must be less than 1 mm, so that the capillarity phenomena of the fluids exceed the gravitational forces. In order to regulate the thickness of the capillary spaces, spacers of 5 to 50 μm are used, whilst spacers of 10 to 200 μm are used for the reservoir. The cell is made tight by bonding the plates by means of spacers.

Prior to assembly, the glass plates are equipped with their electrodes, which are deposited and etched by microlithography. The electrodes are constituted of tin and indium oxide deposits, e.g. of the BALTRACON type, marketed by BALZERS. They are made transparent to light by annealing at 350° C. The representation of the electrodes on the attached drawings has been simplified, but it is pointed out that the gap separating two electrodes of the same plate, e.g. electrodes 16 and 17, must be small, approximately 20 μm. Moreover, as described in French Patent Application 83.10914, filed by the Applicant Company on June 30, 1983, two electrodes of the same plate can have interpenetrating indented contours permitting an easier displacement of the liquid between the electrodes.

After the electrodes have been deposited on plates 1 and 2, deposits, such as R1 and R2 in FIG. 1, are made. These very thin deposits have a thickness of approximately 10 nanometers. For example, it is possible to use an organosilane deposit, particularly alkyl methoxy silane and more particularly N,N-dimethyl-N-octadecyl-3-aminopropyl trimethoxysilyl chloride. This deposit is polymerized under nitrogen at 110° C. after hydrolysis of the methoxy silane groups and the formation of hydrogen and siloxane bonds on the substrate by chemisorption. Due to the thinness of these surface treatments, there is greater wettability at the point where the organic deposit covers the electrodes. Fluorinated polymers can also form non-wetting confinement surfaces. Fluids 1f2 and 2f2 are chosen so that their permittivity differs from that of fluid $f_1$, which can be air as stated hereinbefore. Moreover, it is advantageous for the liquid to be displaced to be slightly corrosive and only have a limited electrical conductivity. Advantageously, the following filling liquids are used:

| Liquid | Permittivity | Electrical conductivity ($\Omega^{-1}$ cm$^{-1}$) |
|---|---|---|
| Cyclohexane | $18.3 \times \epsilon_o$ | $5 \cdot 10^{-18}$ |
| Nitrobenzene | $34.8 \times \epsilon_o$ | $2 \cdot 10^{-10}$ |
| Hexane | $1.88 \times \epsilon_o$ | $10^{-16}$ |

In the case of fluid 1f2, dyes are mixed to make it absorbent in a wavelength spectrum corresponding to the field of use of the modulator. Thus, it is possible to cover spectral absorption bands between e.g. 0.4 and 1.1 μm. In order to prevent electrochemical effects and so as not to increase the power consumption of the cells, preference is given to the use of high solubility, non-ionic dyes. Thus, in the visible range, it is possible to successfully use indophenol blue, Sudan blue and Sudan black B. It is also possible to use anthraquinone dyes, which are particularly stable. In order to obtain a wide spectral absorption band, use is made of mixtures of several dyes, accompanied by the superimposing of cells, e.g. types 10 and 20, each containing one or more dyes.

The volume of fluids 1f2 or 2f2 introduced into a cell is such that it covers the electrodes of the capillary space and may even project slightly beyond the same, in order to overlap the indentation of the aforementioned contour of the electrodes. The fluid placed in the capillary space is then in contact with the electrodes of the reservoirs and can be more easily attracted. Conversely, the arrangement is the same when the fluid is in the reservoirs.

Prisms 40, 41 are bonded to plates 31, 32, in such a way that there is an index adaptation between plates and prisms. In order to facilitate construction, certain elements can be moulded, e.g. in acrylic resins, such as polymethylmethacrylate (PMMA, Plexiglass).

The electrical connections to the generator 56 are formed by providing a not shown extension to the transparent plate and by depositing there, at the same time as the electrodes, connection zones onto which are then plugged a connector, or on which microwelds are produced.

The attenuation of a cell, like cell 1, is, as a function of the concentration of the dye introduced into fluid 1f2, approximately 10%. There can be at least five cells of this type without leading to any prejudicial attenuation when all the cells are non-absorbent. The attenuation of cell 30 is approximately 90%.

The width L, mentioned in FIG. 5, of such a modulator, is 5 to 10 mm. With a width of 10 mm, an operating time of approximately 100 ms is obtained and is more particularly required for the displacement time of the fluid.

In order to cover an optical surface of 60 to 80 mm as may be the case, the association of several cells makes it possible to limit the thickness of the device and retain the response performances by limiting the length of the path taken by the liquid. This leads to a system of modulators, as shown by the isometric view of FIG. 7.

Figure 7:
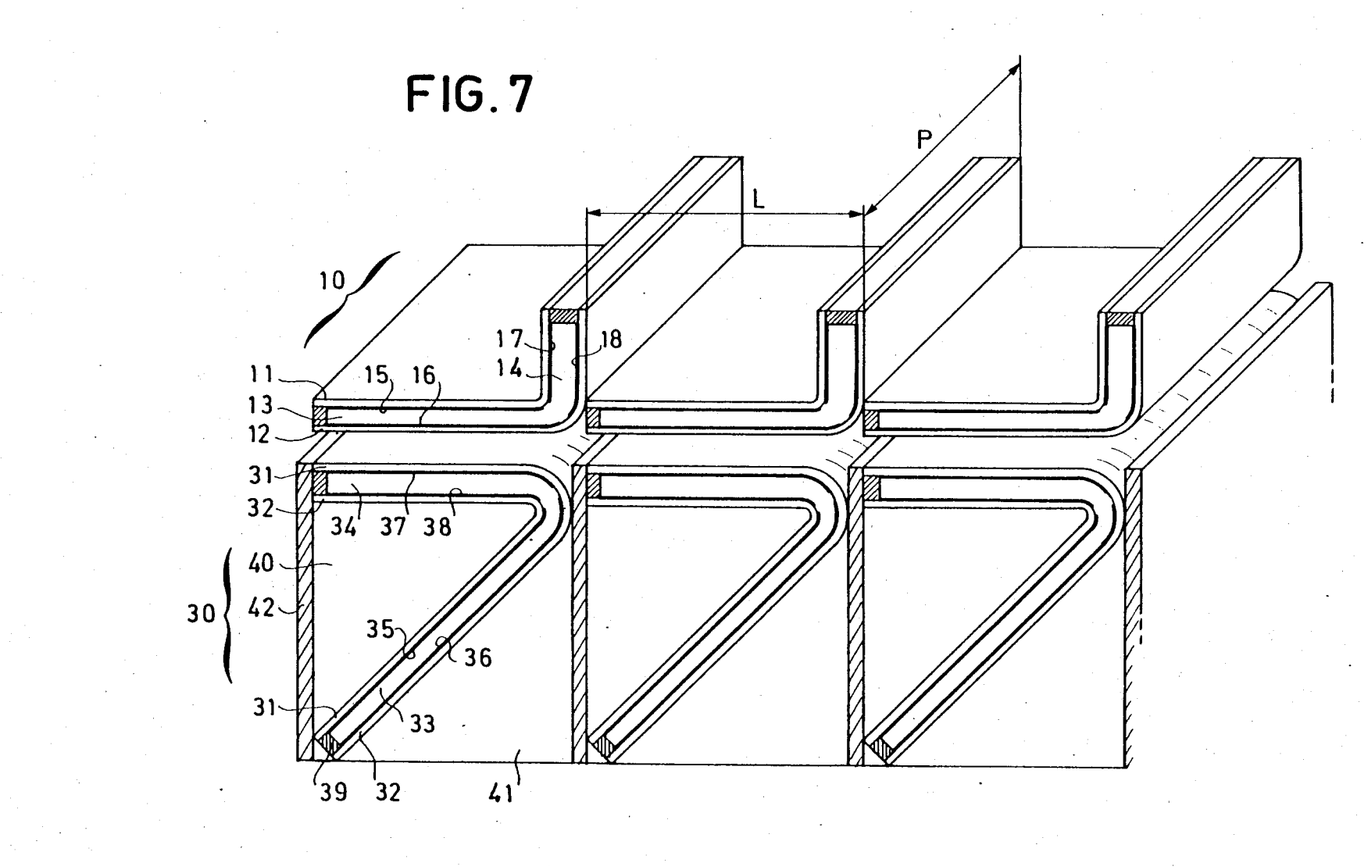
FIG. 7 is an isometric view of an embodiment according to the invention.

Cells 30, like cells 30 of FIG. 5, are arranged along a first plane. Using cells of width L=10 mm, 7 to 8 cells are arranged, as a function of the field to be covered. The length P of the cells is then 70 to 80 mm.

Cells 10 containing an absorbent liquid are arranged along a second plane parallel to the first. As a variant in FIG. 7, these cells only have a single reservoir 14 to the right of capillary space 13. The operation of such a cell is identical to that of the previously described cells. As the width L of a cell 10 is equal to 10 mm, the same number of cells, i.e. 7 to 8 is aligned with cells 30. The length P of cells 10 is also 70 to 80 mm.

Other cells such as 10 are arranged along other planes parallel to the first two, in order to obtain different degrees of light modulation. Cells 10 and 20 can be associated in pairs, in the manner shown in FIG. 8.

Figure 8:
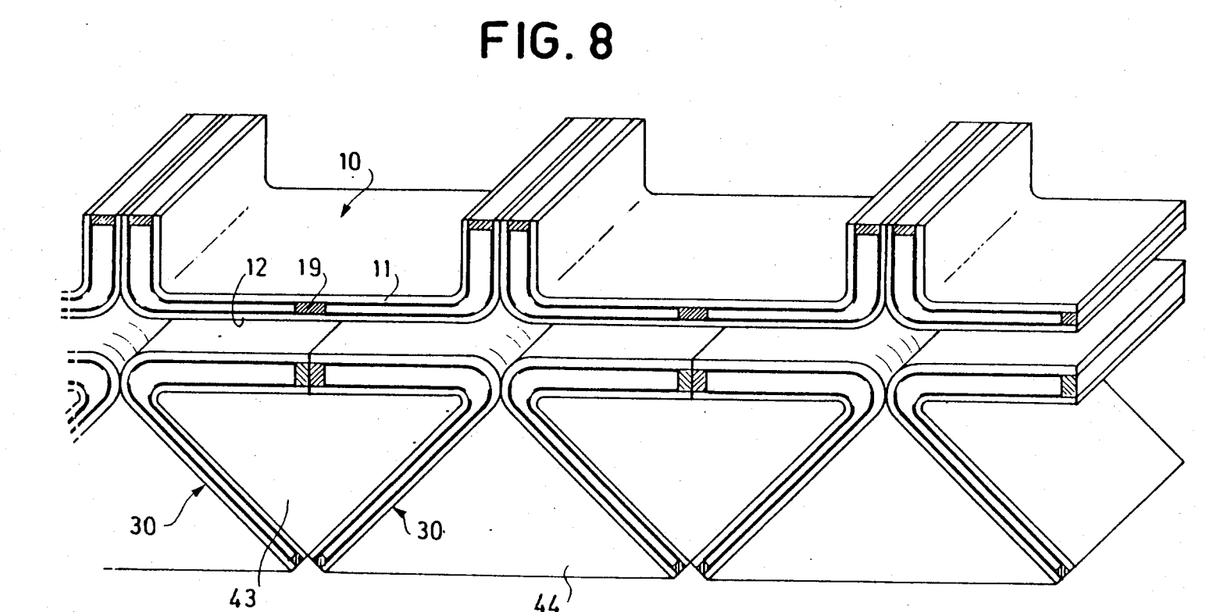
FIG. 8 is an isometric view of a variant according to the invention.

Two cells 10 are combined into one, one having its reservoir to the left and the other having its reservoir to the right. They are produced with a single plate 11 and a single plate 12, whilst a spacer 9 is located in the central part.

Two cells 30 are placed along the same axis as each of these cells and the capillary spaces thereof form a dihedral angle of $\pi/2$ radians. Under these conditions, prisms 40 of these two cells are produced as a single prism 43. In the same way, the prisms 41 of two adjacent cells are produced as a single prism 44.

When the two cells are reflecting, with fluid 2f2 in the reservoirs 34, an incident light beam is reflected by the first cell 30 towards the second cell 30, which reflects the light in the incidence direction. Attenuation is then realised. This arrangement makes it unnecessary to provide the absorbent screens 42 of FIGS. 2 to 7.

In order to increase the possibilities of modulating the mean light intensity of a beam, the invention provides for control cells 55 not only to independently control the different planes of the modulator systems, but also to selectively control each cell in each plane.

Figure 9:
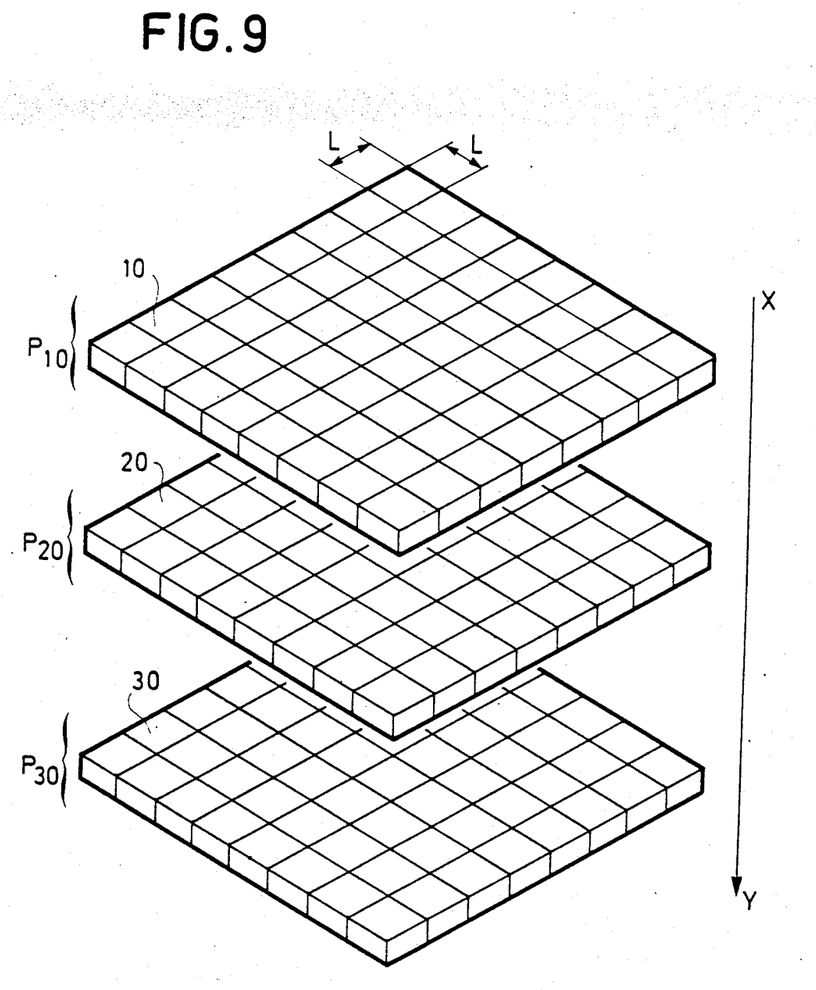
FIG. 9 is a simplified isometric view of an example of the association of cells according to the invention.

Cells are then used which have a length equal to width L. As shown in FIG. 9, a square matrix of cells 10 is arranged in a plane P10. For example, there is a matrix of 8×8 cells. In the same way, cells 20 are assembled in the form of a plane P20 and cells 30 in the form of a plane P30. Planes P10 P20 and P30 are superimposed in such a way that the cells of the same coordinates in the different planes are aligned according to the same axis parallel to axis XY.

What is claimed is:

1. An optical modulator of a light beam comprising:
    a plurality of cells each of which comprise:
    two transparent plates separated one from the other;
    spacing means for holding said transparent plates apart;
    capillary space between said two transparent plates;
    reservoir means located between said two transparent plates for containing at least one fluid;
    electrical field producing means for applying an electrical field between said transparent plates for controlling the displacement of the fluid contained in said reservoir means between said reservoir means and said capillary space, wherein said fluid will be located in said reservoir means in response to the presence of said electrical field;
    measuring means for measuring the intensity of a light beam and for outputting a signal indicative of the measured light;
    control means coupled to said measuring means and the electrical field producing means of each of said cells for providing control information for activation of said electrical field producing means in response to said signal indications of said measured light;
    wherein at least one of said cells is positioned in such a manner such that the capillary space is perpendicular to the direction of said light beam.

2. An optical modulator according to claim 1 comprising:
    at least one cell as defined in claim 1;
    a second cell as defined in claim 1 whose transparent plates are placed in said optical modulator so as to be obliquely positioned in the direction of said light beam, with the capillary space of said second cell being positioned in the section of the beam; and
    the fluid of said second cell being transparent wherein, when said fluid is in the capillary space, the light beam is transmitted without deflection and, when the fluid is in the reservoir, the beam is deflected, and further, wherein said control means selectively controls at least one of said cells.

3. An optical modulator according to claim 2, comprising:
    two triangular prisms with one face of each of them inclined to the direction of the light beam, with a cell being placed between the two aforementioned inclined faces, in such a way
    wherein when the fluid is present in the capillary space said cell - prism assembly transmits the light without deflecting it, and further when the fluid in the capillary is absent, the inner walls of the transparent plates of the cell deflect the light.

4. An optical modulator according to claim 2, wherein the distance between the plates at the reservoir means is the same as the distance between the plates at the capillary space.

5. An optical modulator according to claim 2, wherein the reservoir means of cells which are positioned perpendicular to said light beam are placed on either side of the capillary space and;
    wherein said reservoir means are positioned parallel to the direction of the light beam.

6. An optical modulator according to claim 1, comprising: several cells having their transparent plates aligned perpendicular to the path of the light beam, wherein said control means controls the electrical field producing means of each of said cells such that different degrees of modulation of the light beam occur.

7. An optical modulator according to claim 1, wherein the fluid in cells which are aligned perpendicular to said light beam consists of a liquid mixture which absorbs a given range of wavelengths.

8. An optical modulator according to claim 1 wherein, within a cell, the spacing between the two plates defining a reservoir exceeds the spacing of the two plates defining the capillary space of the same cell.

9. An optical modulator according to claim 1, wherein the capillary space of cells are positioned perpendicular to said light beam and a single reservoir is placed at one end of the capillary space.

10. An optical modulator according to claim 1, wherein a plurality of cells as defined in claim 1 forming a first group of cells are juxtaposed in a first plane perpendicular to the direction of the light beam, with a plurality of cells as defined in claim 1 forming a second group of cells are juxtaposed in a second plane perpendicular to the direction of the light beam, so as to form a modulator system.

11. An optical modulator according to claim 10, further comprising: absorbent screens parallel to the direction of the light beam and separating said second group of cells.

12. An optical modulator according to claim 10, wherein the capillary space of the cells of the second group are arranged perpendicular to the capillary space of the cells of the first group.

13. An optical modulator according to claim 1, wherein said control means controls, as a function of the signal from said measuring means all the cells that are in a common plane.

* * * * *